(12) United States Patent
Cook

(10) Patent No.: US 7,310,417 B1
(45) Date of Patent: Dec. 18, 2007

(54) RESTRICTED VOICE ROUTING

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 616 days.

(21) Appl. No.: 10/294,290

(22) Filed: Nov. 14, 2002

(51) Int. Cl.
*H04M 3/42* (2006.01)

(52) U.S. Cl. .................. 379/210.02; 379/211.01; 379/211.02; 379/207.02; 379/201.01; 379/201.04; 379/142.01

(58) Field of Classification Search .......... 379/210.02, 379/211.01, 211.02, 207.02, 201.01–201.04, 379/142.01
See application file for complete search history.

(56) References Cited

U.S. PATENT DOCUMENTS

| | | | |
|---|---|---|---|
| 5,199,062 A | 3/1993 | Von Meister et al. | |
| 5,467,388 A * | 11/1995 | Redd et al. | 379/210.02 |
| 5,583,564 A | 12/1996 | Rao et al. | |
| 6,041,108 A | 3/2000 | Brewster et al. | |
| 6,134,311 A * | 10/2000 | Ekstrom | 379/201.01 |
| 6,157,705 A | 12/2000 | Perrone | |
| 6,310,939 B1 * | 10/2001 | Varney | 379/88.01 |
| 6,337,899 B1 | 1/2002 | Alcendor et al. | |
| 6,353,663 B1 | 3/2002 | Stevens et al. | |
| 6,633,633 B1 * | 10/2003 | Bedingfield | 379/201.11 |
| 6,711,243 B1 * | 3/2004 | Holt | 379/88.26 |
| 6,754,325 B1 * | 6/2004 | Silver et al. | 379/211.02 |
| 2003/0095651 A1 * | 5/2003 | Book et al. | 379/211.01 |
| 2004/0022382 A1 * | 2/2004 | Sweeney et al. | 379/218.01 |

* cited by examiner

*Primary Examiner*—Quynh H. Nguyen

(57) ABSTRACT

An enhanced AIN telephone system that can screen incoming calls during predetermined time periods and block some calls while allowing selected calls to be completed.

14 Claims, 5 Drawing Sheets

RESTRICTED VOICE ROUTING

BACKGROUND OF INVENTION

This invention relates in general to a method and apparatus for processing network calls within a telephone switching system and in particular to a time of day dependent method and apparatus for restricting access to a particular telephone number.

Telephone systems have become increasingly sophisticated and are designed to provide many services to subscribers. A typical telephone network 10 is schematically illustrated in FIG. 1 where the arrows indicate the flow of information within the network. An individual subscriber telephone 12 is connected to a Local Exchange Carrier (LEC) switch 14. While one telephone 12 is shown in FIG. 1, it will be appreciated that a plurality of telephones and/or other devices, such as personal computers also may be connected from the subscriber to the LEC switch 14. The LEC switch 14 is part of a local telephone company and provides a gateway for connection to long distance carriers, wireless networks and other local telephone companies which are collectively shown in FIG. 1 as a Public Switched Telephone Network (PSTN) 16. The LEC switch 14, which is commonly referred to as a Service Switching Point (SSP) is also connected through a Signaling Transfer Point (STP) 17 to a Service Control Point (SCP) 18. The STP 17 functions as a signal router while the SCP 18 includes a data base and operating instructions for the LEC switch 14. As shown by the double headed arrows in FIG. 1, information flows in both directions between the individual components. Also, note that the connection between the LEC switch 14, or SSP, and the SCP 18 is indicated by a dashed line. The dashed line represents a signaling path between the LEC switch 14 and the SCP 18. There is not a voice bearing path connecting the LEC switch 14 and the SCP 18. Instead, logic contained in the SPC 18 responds to signals sent from the LEC switch 14 with instructions concerning how the LEC switch 14 should respond to incoming calls.

The LEC switch 14 recognizes service requests from either the subscriber telephone 12 or the PSTN 16. Upon receiving an incoming call from the PSTN 16 for the telephone 12, the LEC switch 14 will attempt to route the call to the telephone 12. If the LEC switch 14 is not able to complete the call, the LEC switch 14 will send a query to the SCP 18 that includes the Automatic Number Identification (ANI) of the called and calling telephone station. The SCP 18 will access its data base, and, based upon the information stored therein, retrieve a set of instructions that are forwarded to the LEC switch 14 for handling the call. For example, if the telephone 12 is busy, the SCP 18 can cause the LEC switch 14 to send a "call waiting" signal to the telephone 12.

The SCP 18 can include a Service Management System (SMS) 19 that provides instructions to the SCP 18 concerning the handling of calls. The combination of the SCP 18 and SMS 19 is referred to as an Advanced Intelligent Network (AIN) 19A. For example, the subscriber can instruct the SMS 18 to forward all incoming calls to another telephone ANI. The SMS 18 will store the alternate ANI and transmit the alternate number to the SCP 18. The SMS 18 will also activate an AIN feature in the LEC switch 14 to forward incoming calls to the subscriber ANI to the SCP 18 for rerouting to the alternate ANI. Accordingly, incoming calls to the subscribers' telephone 12 will be intercepted by the LEC switch 14 and forwarded to the alternate ANI, as per instructions received from the Service Control Point 18.

The AIN 19A can also provide a number of selective services to the individual telephone subscriber. Such services include a "call prompter" service with which the AIN 19A provides a request that the caller enter a series of digits via a Dual Tone Multi-Frequency (DTMF) telephone keypad. The digits are used by the AIN 19A to direct routing of the call or to provide a security check. Additionally, the AIN 19A can provide an "inbound call restriction" service that filters the incoming calls by area code, exchange code (NNX) or ANI. The inbound call restriction service also may be selectively operative during designated time of day or day of week. Another option is a "do not disturb" service which provides call filtering that allows access only to calls from preselected ANI's.

Unfortunately, with the increasing sophistication of telephone systems, the number of undesirable telephone calls is increasing. For example, dinner time is a favorite time for telemarketers to attempt to contact potential customers. As described above, the AIN network illustrated in FIG. 1 can be utilized to block all calls to a designated telephone ANI during predetermined time periods. However, there are certain calls that a subscriber might want to receive regardless of the time of day, such as calls from a child who is attending a distant college. Accordingly, it would be desirable to provide a telephone system that could screen incoming calls and only block some of the calls while allowing selected calls to be completed. It would also be desirable to sort the blocked calls for a later response.

SUMMARY OF INVENTION

This invention relates to an enhanced AIN telephone system with a time of day dependent selective call screening that blocks some incoming calls while allowing selected incoming calls to be completed.

The present invention contemplates a telephone system comprising a local telephone, or destination telephone, having an automatic number identification that is connected to a local exchange company switch. A service control point and an intelligent voice response unit also are connected to the local exchange company switch. The local exchange company switch includes an automatic number identification trigger that is set to forward all incoming calls to the the destination telephone to the service control point. The service control point is operative during a preselected time period to connect the incoming calls to an intelligent voice response unit. The intelligent voice response unit is provided with a script and is operative to query the incoming call in accordance with the script. Depending upon the response provided by the caller to the query, the intelligent voice response unit will cause the local exchange company switch to connect the incoming call to either the destination telephone or to a voice mailbox system that receives and stores messages for later retrieval by the subscriber.

The service control point is also operative during non-preselected time periods to connect all of the incoming calls immediately to the destination telephone.

The intelligent voice response unit is further operative to provide a plurality of queries to the incoming caller in accordance with responses received from the queries for connection to either the voice mailbox system or the telephone.

The invention also contemplates a method for operating the above system. The method includes determining whether an incoming call to a designated telephone is during a predetermined restricted calling time period. If the call is during the restricted time period, the call is connected to the intelligent voice response system. The intelligent voice response system queries the caller, and depending upon the response, causes the caller to be either connected to the local telephone or to a voice mail system. Any calls that are outside of the restricted time period are connected to the local telephone.

Various objects and advantages of this invention will become apparent to those skilled in the art from the following detailed description of the preferred embodiment, when read in light of the accompanying drawings.

DETAILED DESCRIPTION

Figure 1:
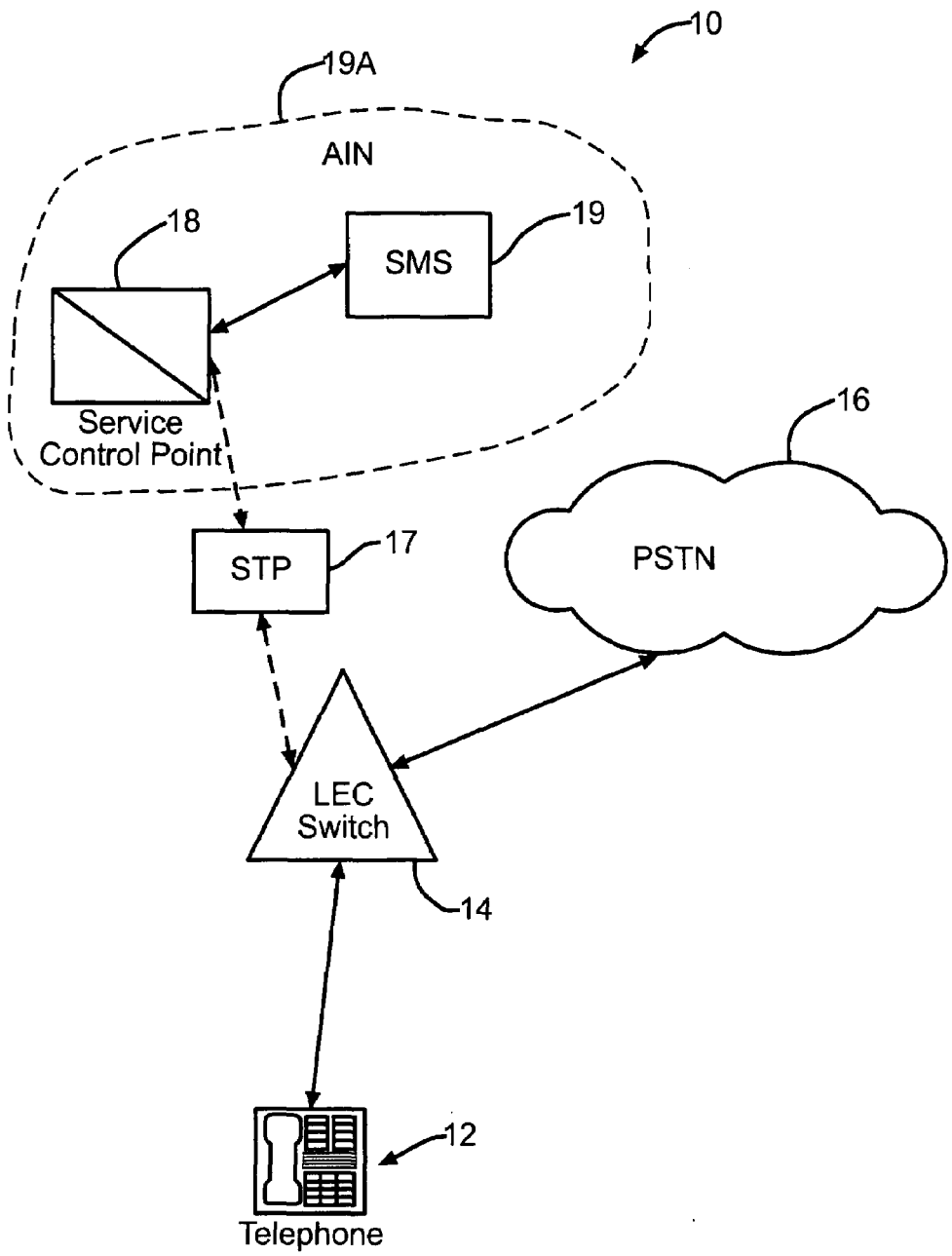
FIG. 1 is a schematic diagram of a known telephone network.
Figure 2:
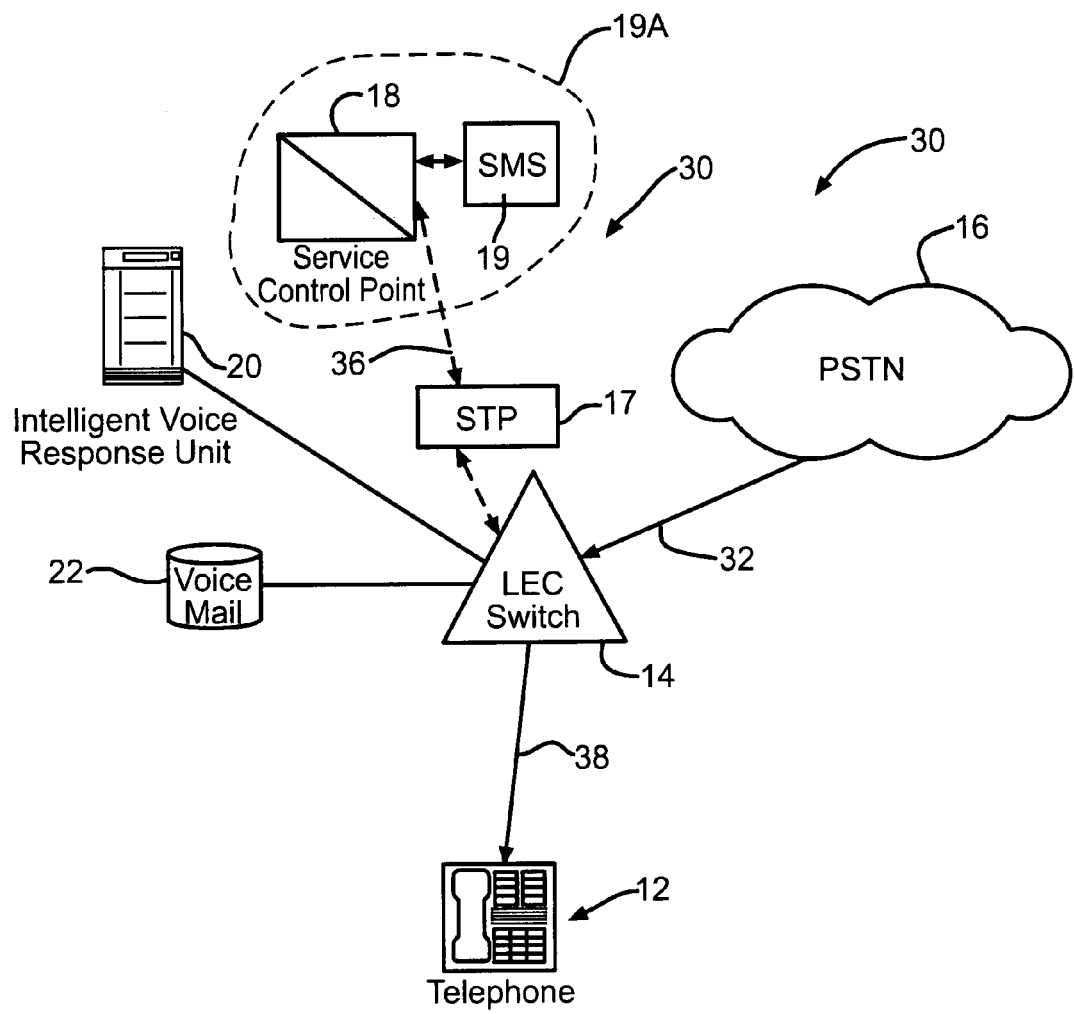
FIG. 2 is a schematic diagram illustrating the operation of an enhanced telephone network that is in accordance with the invention during non-restricted hours.
Figure 3:
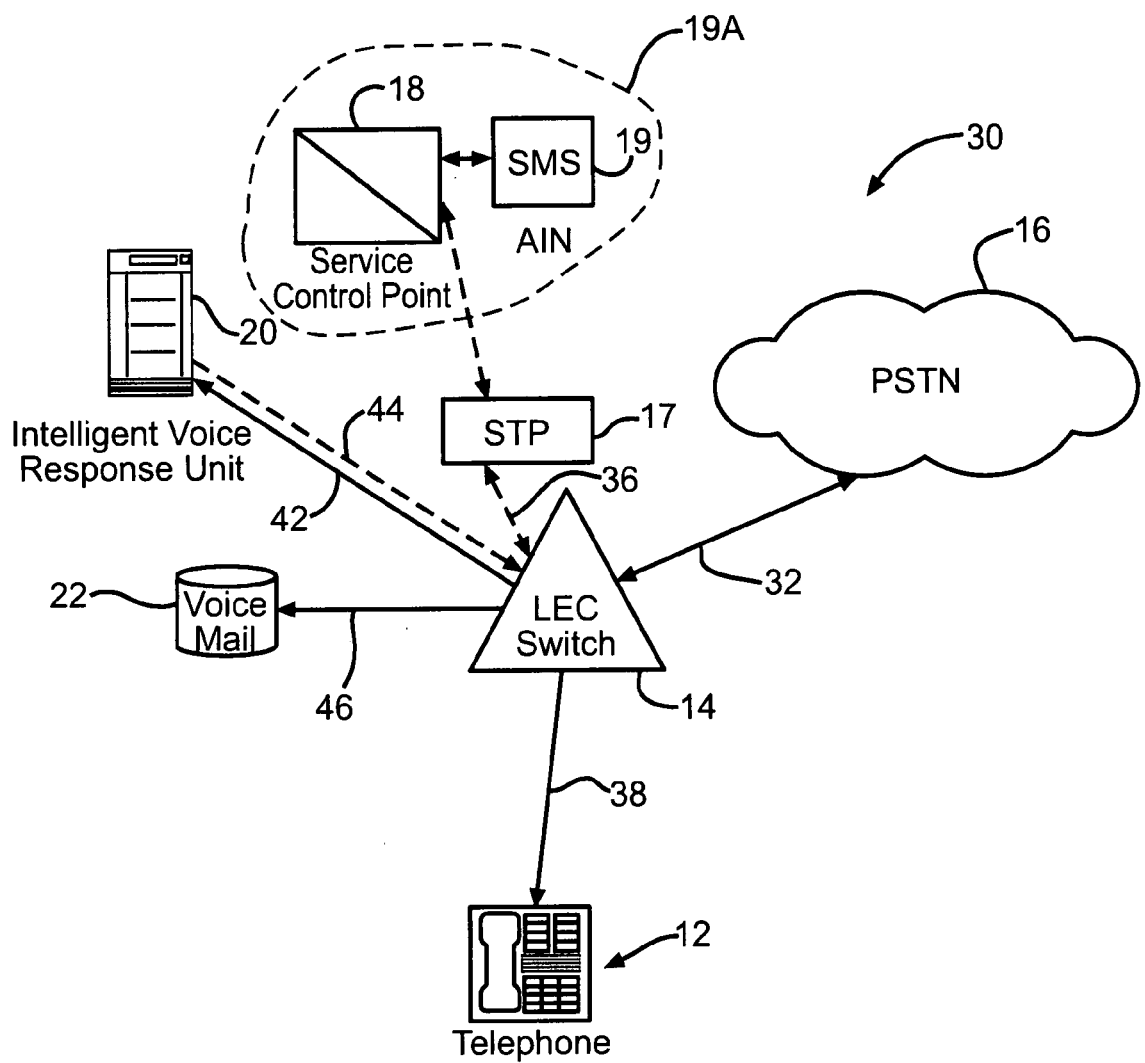
FIG. 3 is a schematic diagram illustrating the operation of an enhanced telephone network that is in accordance with the invention during restricted hours.

The present invention contemplates an enhanced AIN telephone system with a time of day dependent selective call screening that blocks some incoming calls while allowing selected incoming calls to be completed. The enhanced system utilizes commercially available equipment to provide the desired selective call screening. Referring again to the drawings, there is shown in FIGS. 2 and 3, schematic diagrams that illustrate the operation of the enhanced system, which is shown generally at 30, in accordance with the invention. The operation of the enhanced system 30 is illustrated with sequentially numbered arrows. Components shown in FIGS. 2 and 3 that are similar to components shown in FIG. 1 have the same numerical identifiers.

The network 30 shown in FIG. 2 also includes an Intelligent Voice Response Unit (IVR) 20 and a Voice Mailbox System 22 connected to the LEC switch 14. The IVR 20 is a specialized computer system that plays a pre-recorded or computer generated greeting to a caller. The greeting is typically a voice recording stored digitally upon a storage device that provides the caller with a menu of processing options that can be selected by depressing telephone dial pad keys. Currently, IVR's also are available that recognize voice responses, allowing a "hands free" interaction with the device. The Voice Mailbox System 22 stores messages for later retrieval by the subscriber. While the IVR 20 and the Voice Mailbox System 22 are shown as separate components in FIGS. 2 and 3, it will be appreciated that the Voice Mailbox System 22 also may be included within the IVR 20.

In order to implement the enhanced system 30 for calls to a specific subscriber telephone ANI, an AIN 1.0 terminating number trigger in the LEC switch 14 is enabled to refer all calls to the specified telephone ANI to the SCP 18 for enhanced routing. Accordingly, all incoming calls to the LEC switch 14 for the specified telephone ANI will be routed to the SCP 18. Additionally, the SCP 18 is provided with a modified time of day routing feature that is normally included in an Inter-Exchange Carrier (IXP) SCP, that is a long distance telephone company service control point. The time of day routing feature allows the SCP 18 to be programmed to instruct the LEC switch 14 to route all calls directed to the specified ANI during the restricted time period to the IVR 20 for screening. The user would select the time period for screening calls. For example, for a residential user, the time period for screening could be from 7 PM to 7 AM. Finally, the IVR 20 is programmed to provide an interactive call routing feature in response to the incoming call. The details of the operation of the above features will be further explained in the following description.

The operation of the enhanced system 30 during non-restricted hours is illustrated in FIG. 2 and the operation during restricted hours is illustrated in FIG. 3. The non-restricted hours operation illustrated in FIG. 2 is initiated upon receipt of a telephone call for the specific subscriber telephone 12 at the LEC switch 14 from the PSTN 16, as shown by the arrow labeled 32. The terminating number trigger in the LEC switch 14 recognizes that the called telephone ANI is subject to screening and requests instructions from the SCP 18 over the signaling line labeled 36. The SCP 18 determines whether the call to the specified subscriber is within the restricted hours. Because the time is not within the restricted hours, the SCP 18 instructs the LEC switch 14 through the signaling line 36 to complete the call to the subscriber telephone 12. The completed call is shown by the arrow labeled 38.

The restricted hours operation of the system 30 is illustrated in FIG. 3. The system 30 is again initiated upon receipt of a telephone call for the specific subscriber telephone ANI at the LEC switch 14 from the PSTN 16, as shown by the arrow labeled 32. The terminating number trigger in the LEC switch 14 again recognizes that the called ANI is subject to screening and requests instructions from the SCP 18 over the signaling line labeled 36. The SCP 18 determines that the call to the specified subscriber is within the restricted hours. Because the time is within the restricted hours, the SCP 18 instructs the LEC switch 14 through the signaling line 36 to forward the call to the IVR 20 for further processing. The LEC switch, forwards the call to the IVR 20 via the voice line shown by the double headed arrow labeled 42. The IVR 20 generates a message, or prompt, to interrogate the caller and forwards the prompt through the LEC switch 14 and the PSTN 16 to respond to the caller, as shown by the voice paths labeled 42 and 32.

In the preferred embodiment, the prompt generated by the IVR 20 requests that the calling party provide an extension number. Alternately, the IVR 20 could be voice responsive and request a vocal response from the caller. The present invention contemplates that authorized callers would be provided with a response such as a predetermined extension number, or password, to complete a call to the specified subscriber during the restricted hours. The IVR 20 also can be programmed to prompt other extensions that would be utilized for collating callers, such as vendor requests, service calls, charitable organizations, etc. The invention also contemplates that the IVR 20 would be programmed with a script of sequenced prompts and would be operable to interrogate the caller with a series of questions. Logic in the IVR would select the next prompt depending upon the caller's response.

The caller responds to the prompt with an extension number, which can be keyed in by depressing the buttons on the telephone dial pad or by a verbal prompted response. The caller response is transmitted over the voice path labeled 32 that connects the PSTN 16 to the LEC switch 14. The LEC switch 14 forwards the response to IVR 20 over the voice path labeled 42. The IVR 20 compares the response to stored responses to determine the instructions to the LEC switch 14.

If the caller's response did not match the password for authorizing immediate connection to the subscriber's telephone 12, the IVR 20 will instruct the LEC switch 14, via the signal line labeled 44, to connect the caller to the Voice Mailbox System 22, as shown by the voice path labeled 46. The caller can then leave a voice mail message for later retrieval by the subscriber. Depending upon the caller's responses to the prompt, the messages can be sorted as per topic within the Voice Mailbox System 22 by the IVR 20 directing the LEC switch 14 to connect the caller to a specific mailbox within the Voice Mailbox System 22. Also, as described above, the Voice Mailbox System may be included within the IVR 20, in which case the callers message would be received over the voice line labeled 42 in FIG. 3.

If, on the other hand, the caller's response did match the password, the IVR 20 will instruct the LEC switch 14, via the signal line labeled 44, to connect the caller to the subscriber's telephone 12, as shown by the arrows labeled 52 and 56. The SCP 18 will then instruct the LEC switch 14 to connect the caller to the subscriber's telephone 12 as shown by the voice path labeled 38.

Figure 4:
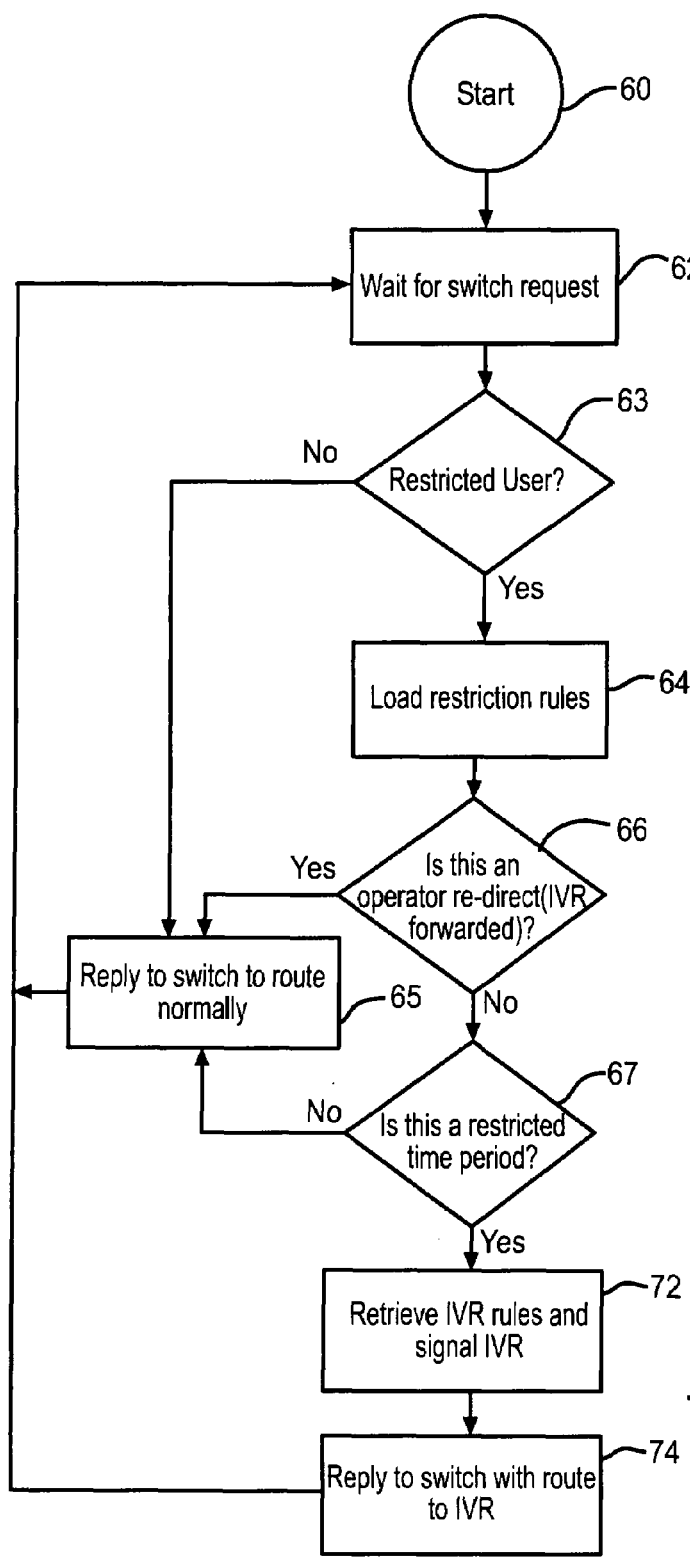
FIG. 4 is a flow chart for operation of a Service Control Point in accordance with the present invention.

An algorithm for the operation of the SCP 18 is illustrated by the flow chart shown in FIG. 4. The flow chart is entered through box 60 and proceeds to functional block 62 where the LEC switch 14 waits for a switch request, or incoming call. Upon receipt of an incoming call, the LEC switch 14 examines the called ANI to determine if the called party is a restricted user in decision block 63. If the called ANI is restricted, the LEC switch 14 requests instructions from the SCP 18 where the restriction rules for the called party are loaded from the associated data base, as shown in functional block 64. The restriction rules include the restricted hours for screening incoming calls. If the called ANI is not restricted, the algorithm transfers to functional block 65 where the LEC switch 14 is instructed to immediately forward the call to the subscriber's telephone 12.

Returning to the case of a restricted ANI, the algorithm then advances from functional block 64 to decision block 66 where the SCP 18 determines if the message is a re-direct request forwarded from the IVR 20, as could occur after the caller has correctly responded to the IVR prompt. It will be appreciated that such a re-direct request also could occur if the call is handled as a re-origination. A re-direct request may not occur if the IVR 20 and LEC switch 14 implement a "Connect to Resource" operator feature. Because this is a first pass through the algorithm, the request is not a re-direct and the algorithm transfers to decision block 67 where the SCP 18 checks the restriction rules to determine if the call is during a restricted time period. If the call is not during a restricted time period, the algorithm transfers to functional block 65 where the LEC switch 14 is instructed to immediately forward the call to the subscriber's telephone 12.

If, in decision block 67, it is determined that the call is during a restricted time period, the algorithm transfers to functional block 72 where the IVR rules corresponding to the subscriber's telephone are retrieved from the data base and signaled to the IVR 20. The IVR rules can be either transmitted through the LEC switch 14 via the signal lines labeled 36 and 44 in FIG. 3 or through a direct signal line (not shown) that connects the SCP 18 to the IVR 20. The latter path is applicable when the SCP 18 and IVR 20 are co-located at the same facility. The invention also contemplates that the SCP 18 would provide information to the IVR 20 for processing the incoming call. Such information would include the calling party ANI and the subscriber's ANI. The IVR 20 would then select the prompt scripts corresponding to the subscriber's ANI for processing the call. Alternately, the invention contemplates that the IVR 20 would select the prompt scripts corresponding to the caller's ANI or corresponding to both the subscriber's ANI and the caller's ANI. The SCP 18 then replies in functional block 74 to the LEC switch 14 via the signal line labeled 36 with an instruction to forward the call to the IVR 20 for processing. At this point, the IVR 20 functions as a call terminating device, with the caller connected to the IVR 20.

If it is determined that the message is a redirect in decision block 66, as will occur after the IVR has caused a reply prompt to be received from the caller, the algorithm transfers to functional block 65 where the LEC switch 14 is instructed to forward the call to the subscriber's telephone 12. As was explained above, this situation will only occur if the logic in IVR 20 reached a decision to connect the caller to the subscriber's telephone 12. Otherwise, the IVR 20 would have directed the LEC switch 14 to connect the caller to the Voice Mail box 22 and a redirect will not occur.

It will be appreciated that the flow chart shown in FIG. 4 is exemplary and that the operation of the SCP 18 in accordance with the invention also can be accomplished with other algorithms.

Figure 5:
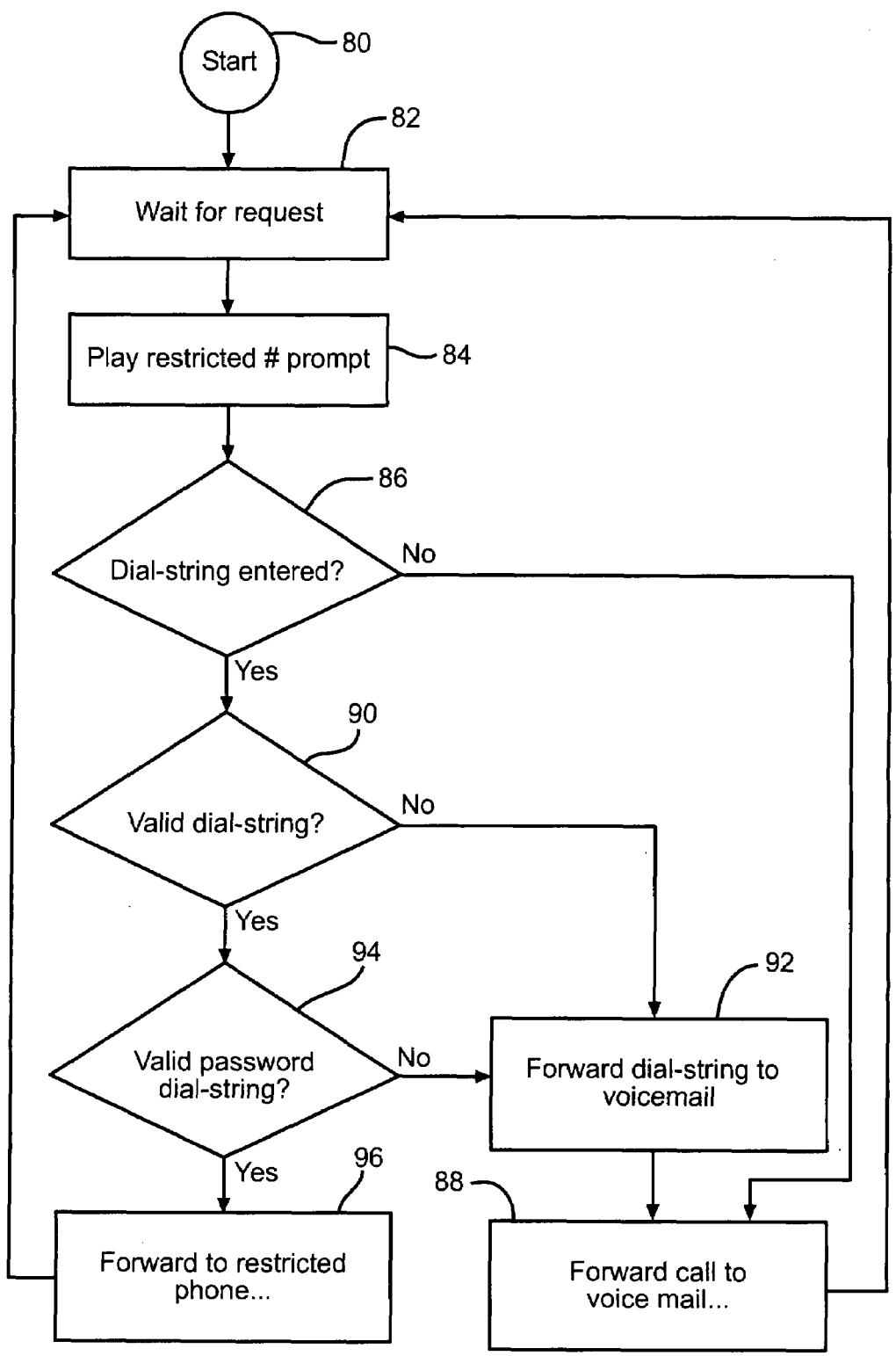
FIG. 5 is a flow chart for operation of an Intelligent Voice Response Unit in accordance with the present invention.

An algorithm for the operation of the IVR 20 is illustrated by the flow chart shown in FIG. 5. The algorithm is entered through block 80 and proceeds to functional block 82 where the IVR 20 is waiting for a request. Upon receiving a request, that is, a call forwarded by the LEC switch 14 in response to instructions from the SCP 18, the IVR plays the restricted prompt, or message, to the caller in functional block 84. The IVR then awaits the response from the caller, which is shown in FIG. 5 as a dial string supplied by the caller in answer to the prompt, in functional block 86. If no dial string is entered within a predetermined time period, the IVR 20 forwards the call to the voice mail system in functional block 88. If a dial string is entered within the predetermined time period, the algorithm advances to decision block 90 where the entered dial string is compared to expected responses. Alternately, a verbal response could be requested and processed instead of a dial string.

If the dial string is not valid, that is the dial sting does not match one of the expected prompt responses, the algorithm forwards the dial string to the voice mail system in functional block 92, where the voice mail uses the dial string as a secondary index to the calls received, and the call to the voice mail system in functional block 88. The voice mail system also uses the time of call as a primary index to the received calls. If the dial string is valid, the algorithm advances to decision block 94 where the dial string is compared to the password. If the dial string matches the password, the IVR 20 then replies in functional block 96 to the LEC switch 14 with an instruction to forward the call to the restricted telephone 12. As indicated above in the alternative, a correct verbal message also could cause the IVR 20 to instruct the LEC switch 14 to forward the call to the restricted telephone 12. In either case, this is a forwarding function. Depending upon how the forwarding function is handled, the IVR forwarded message may appear as an incoming call, in which the terminating number trigger will query the SCP 18 for instructions, or the call may look like an operator assisted action, in which case the LEC switch 14 may know to simply terminate the call to the restricted telephone 12. If the dial string does not match the password, the algorithm forwards the dial string to the voice mail system in functional block 92 where the dial string is utilized to support a message sorting function. The actual call is forwarded to the voice mail in functional block 88. The invention contemplates that only selected extensions would actually be connected to the desired destination. All incorrect extensions would be serviced by voice mail. Since the voice mail is typically stored on a disc, the data could be easily accessed later with an alternate index key. It is contemplated that the extension and the time of the call could be utilized as the alternate index key.

It will be appreciated the flow chart shown in FIG. 5 is exemplary and that the operation of the IVR 20 in accordance with the invention also can be accomplished with other algorithms.

While the invention has been illustrated and described above for a residential telephone subscriber, it will be appreciated that the invention also can be practiced for other users. For example the invention could find application within a commercial setting. Many companies conduct business worldwide and communication across multiple time zones can complicate the transmission of information. Accordingly, the enhanced telephone system described above also can be utilized to screen calls according to the time of day for business executives. Thus, important messages could be passed through by providing other key managers with the necessary codes or passwords for the IVR 20 to bypass the Voice Mailbox System 22 and connect the caller directly with the desired party. Other calls would be sorted and stored by subject in the Voice Mailbox System 22.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A telephone system comprising:
   a local telephone;
   a local exchange company switch connected to said telephone;
   a service control point connected to said local exchange company switch;
   a voice mailbox system connected to said local exchange company switch; and
   an intelligent voice response unit connected to only said local exchange company switch, said intelligent voice response unit including a sequenced plurality of queries, said intelligent voice response unit also including logic to select a subsequent query depending upon a caller response to a preceding query, said local exchange company switch set to forward all incoming calls from calling parties to said local telephone to said service control point, said service control point operative during a preselected time period to direct said local exchange company switch to connect all of said incoming calls to said intelligent voice response unit, said intelligent voice response unit operative to provide said sequenced plurality of queries to said calling party and using logic to select a subsequent query depending upon a caller response to a preceding query, said intelligent voice response unit being further operative to sort said incoming calls per topic within said voice mailbox system in accordance with said responses received from said calling party to said queries.

2. The telephone system according to claim 1 wherein said intelligent voice response unit is further operative to cause said local exchange company switch to selectively connect said calling party to a specific mailbox within said voice mailbox system that corresponds to said sorted message, said voice mailbox system operative to record an incoming message within said specific mailbox.

3. The telephone system according to claim 2 wherein said intelligent voice unit is further operative to to cause said local exchange company switch to selectively connect said calling party to said local telephone in response to said calling party responses to said queries.

4. The telephone system according to claim 3 wherein said service control point is also operative during non-preselected time periods to immediately connect all of said incoming calls to said telephone.

5. The telephone system according to claim 4 wherein said service control point is included in an advanced intelligent network.

6. The telephone system according to claim 4 wherein said responses to said intelligent voice unit queries are a series of digits generated by a dual tone multi-frequency telephone keypad.

7. The telephone system according to claim 4 wherein said responses to said intelligent voice unit queries are oral sounds.

8. The telephone system according to claim 4 wherein said service control point provides an automatic number identifier for both said local telephone and a telephone utilized to originate the call to said intelligent voice response unit and further wherein said intelligent voice response unit is responsive to one of said local telephone automatic number identifier and said call originating automatic number identifier to select said queries from said plurality of queries.

9. The telephone system according to claim 4 wherein said service control point provides an automatic number identifier for both said local telephone and a telephone utilized to originate the call to said intelligent voice response unit and further wherein said intelligent voice response unit is responsive to both of said local telephone automatic number identifier and said call originating automatic number identifier to select said queries from said plurality of queries.

10. The telephone system according to claim 4 wherein said local exchange company switch is connected to a public switched telephone network, said local exchange company switch being operable to receive incoming calls for said local telephone from said public switched telephone network.

11. A method for operation of a telephone system comprising the steps of:
   (a) providing an intelligent voice response unit and a voice mailbox system that are both connected to a local exchange company switch, the local exchange company switch being connected to both a service control point and a local telephone, the intelligent voice response unit including a sequenced plurality of queries and being operative to provide the sequenced plurality of queries to a calling party, the intelligent voice response unit including logic to select a subsequent query depending upon a caller response to a preceding query, the intelligent voice response unit being further operative to sort the incoming calls per topic within the voice mailbox system in accordance with the responses received from said calling party to said queries;
   (b) transferring a call from a calling party to the local telephone to the service control point to determine whether the call is during a preselected restricted calling time period;
   (c) connecting the incoming call to the intelligent voice response unit upon determining that the call is during the preselected restricted calling time period;

(d) providing the sequenced plurality of queries to a calling party with the intelligent voice response unit, the intelligent voice response unit using logic to select a subsequent query depending upon a caller response to a preceding query;

(e) comparing the response received from the calling party to the queries within the intelligent voice response unit to stored responses; and (f) sorting the incoming calls per topic within the voice mailbox system in accordance with the responses received from said calling party to said queries.

12. The method for operation of a telephone system according to claim 11 wherein, during step (f), the local exchange company switch is caused to connect the caller to the voice mail system and said intelligent voice response unit is further operative to cause the local exchange company switch to selectively connect the calling party to a specific mailbox within the voice mailbox system that corresponds to the sorted message, the voice mailbox system being operative to record an incoming message within the specific mailbox.

13. The method for operation of a telephone system according to claim 12 wherein, during step (f), the intelligent voice response unit causes the local exchange company switch to connect the calling party to the local telephone in response to the responses received from the calling party to the queries.

14. The method for operation of a telephone system according to claim 13 wherein, in step (f), the incoming call is connected to the local telephone when the call is not within the preselected restricted calling time period.

* * * * *